May 17, 1938.　　　　J. W. BROWN　　　　2,117,273
APPARATUS FOR REMOVING OIL FROM WATER
Filed March 23, 1936
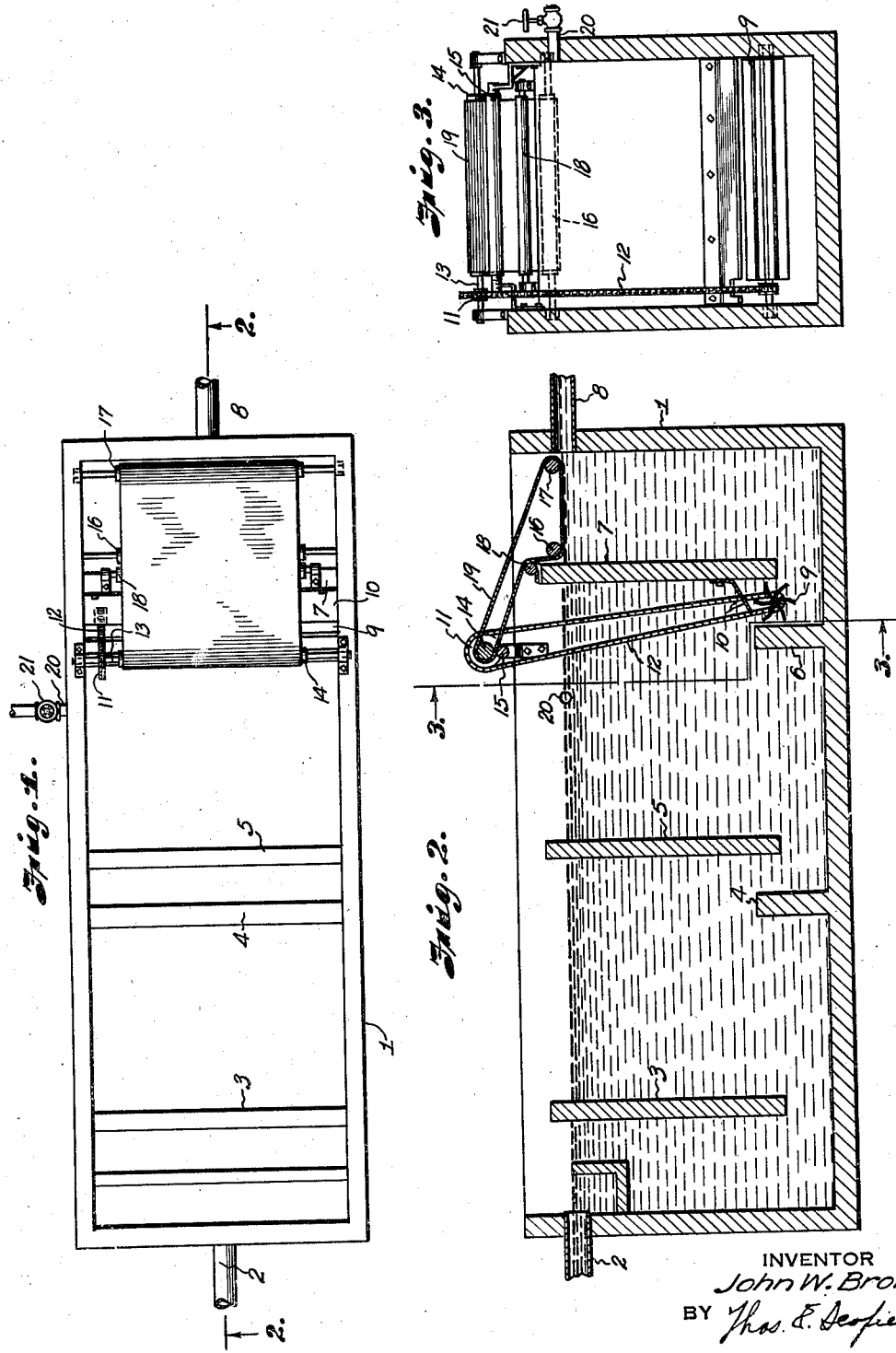
INVENTOR
John W. Brown
BY Thos. E. Scofield
ATTORNEY Patented May 17, 1938

2,117,273

UNITED STATES PATENT OFFICE 2,117,273

APPARATUS FOR REMOVING OIL FROM WATER

John W. Brown, Baltimore, Md., assignor to Continental Oil Company, Ponca City, Okla., a corporation of Delaware Application March 23, 1936, Serial No. 70,293

4 Claims. (Cl. 210—60)

My invention relates to an apparatus for removing oil from water and more particularly for removing oil from the condenser water, heat exchanger water, and the like, in oil refineries.

It has been the practice to provide traps, separators, and the like, for removing oil from water condensed from steam and used in heat exchangers for cooling or heating oil. The devices of the prior art have been successful in removing the major part of the oil from water but it is found that there is always a trace of oil remaining in the water which appears when the water is discharged into a stream. The trace of oil becomes manifest in a small rainbow or film 50 or 100 yards down stream from the separator or trap. It may be that this amount of oil is emulsified in the water so that it does not rise to the top of the water for removal at the trap. As the water is discharged into the stream, these small globules of oil will rise to the surface and break, causing a film or rainbow.

The discharge of oil into a navigable or piscatorial stream is usually prohibited by law. Refiners, furthermore, have been frequently subjected to suits for damage caused by the discharge of oil into streams by riparian tenants.

One object of my invention is to provide a method for removing the last traces of oil from water after it has passed through the customary traps or separators employed in the art.

Another object of my invention is to provide an apparatus for removing the last traces of oil from water contaminated with oil after the water has been subjected to the removal of the major part of the oil by means of separators or traps.

Other and further objects of my invention will appear from the following description.

In general my invention contemplates the provision of a settling chamber having a plurality of passes formed by baffles into which the water containing oil to be separated is passed. The discharge passage from the settling tank is covered with a blanket of oil absorbent material which is moved over the surface of the oil to constantly present a fresh oil absorbing surface to the water.

In the accompanying drawing which forms part of the instant specification and is to be read in conjunction therewith and in which like reference numerals are used to indicate like parts in the various views;

Figure 1 is a plan view of a device showing one embodiment of my invention and capable of carrying out the method of my invention.

Figure 2 is a sectional elevation of the device shown in Figure 1 taken on a line 2—2 of Figure 1.

Figure 3 is a sectional view taken on the line 3—3 of Figure 2.

More particularly referring now to the drawing, water containing oil is passed into a settling tank 1 through an inlet pipe 2 from a trap, separator or the like. The settling tank 1 may be made of any suitable material and is provided with a plurality of baffles 3, 4, 5, 6, and 7. The baffles form an elongated path through which the water must flow to an outlet pipe 8 for discharge into a stream or other body of water. Positioned between baffles 6 and 7 is a paddle wheel 9, suitably mounted for rotation by the passage of water to the confined space between baffles 6 and 7. In order to increase the velocity of water flowing by the paddle wheel, a baffle 10, secured to baffle 7, may be provided. The paddle wheel 9 drives a sprocket wheel 11 through a drive chain 12. The sprocket wheel 11 is keyed to shaft 13 which carries a roller 14. The roller 14 is spaced adjacent to roller 15, rollers 14 and 15 being adapted to act as a wringer. A pair of rollers 16 and 17 are mounted across the top of the last pass within the settling tank 1. A guide roller 18 is mounted on the top of baffle 7. Around rollers 14, 16, 17, and 18 is passed an endless blanket 19 made of any suitable oil absorbent material or fibre. The blanket may be made of cotton toweling, of wool flannel or the like, it being understood that any flexible material which can be formed into an endless blanket and has the power to absorb oil may be employed. The blanket is driven by the rotation of roller 14 so as to constantly present a fresh surface to the outgoing water. The oil which is absorbed by the blanket is squeezed therefrom between rollers 14 and 15, which act as a wringer. While I have shown a paddle wheel drive for the blanket, it is to be understood that it may be driven by means of a small electric motor or by any other suitable means.

In operation, oil from a separator or trap enters the settling tank 1 through pipe 2. Inasmuch as the volume of tank 1 is large, the body of liquid passed thereinto will be substantially quiescent. A considerable amount of oil will rise to the surface of the water from which it may be drained through pipe 20 which is provided with a valve 21. This oil may be passed back to the trap. It will be observed that the water bearing oil must change its direction a number of times before passing to the outlet 8. The change of direction tends to aid in the separation of oil and water. In passing by the paddle wheel 9 the water will rotate the sprocket wheel 11 through driving chain 12. The rotation of sprocket wheel 11 will drive blanket 19, presenting a fresh oil absorbing surface to the outgoing oil and water. This oil absorbing surface will readily absorb the last traces of oil so that the effluent water passing to the stream through pipe 8 will be substantially free of oil which might contaminate the stream into which the water is being discharged.

It will be understood that certain features and sub-combinations are of utility and may be employed without reference to other features and sub-combinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. In a device for separating oil from water, a tank, an inlet to said tank for water containing oil to be separated, an outlet from said tank for discharging water substantially free of oil, a plurality of baffles in said tank between said inlet and said outlet for causing the oil-bearing water to flow in an elongated path, a water operated motor positioned in the path of flow between said inlet and said outlet, an endless blanket of oil absorbing material having a portion thereof positioned in said tank in the path of water flowing to said outlet, means actuated by said water operated motor for moving said blanket past the water in contact therewith, and means for removing liquid adsorbed by said blanket therefrom.

2. In a device for separating oil from water bearing the same, a tank, an inlet to said tank for introducing water contaminated by oil into the tank, an outlet from said tank for withdrawing substantially oil-free water therefrom, a plurality of baffles positioned in said tank between said inlet and said outlet for causing the water to flow in an elongated path, an endless blanket of oil absorbing material having a portion thereof positioned in said tank in contact with the water adapted to absorb oil therefrom, means for moving said blanket whereby a fresh portion thereof is continually being contacted with the water, and means for removing a portion of the liquid absorbed by said blanket.

3. In a device for removing oil from water, a tank, an oil contaminated water inlet to said tank, an outlet from said tank for withdrawing water substantially free from oil, an endless blanket of oil absorbing material having a portion thereof in contact with the water in said tank, means for moving said blanket whereby a fresh portion thereof is continually adapted to contact the water for absorbing oil therefrom, and means for squeezing absorbed oil from said blanket.

4. In a device of the character described, means for removing oil from water comprising in combination an endless blanket of oil absorbing material having a portion thereof in contact with water from which oil is to be removed, means for moving said blanket to continuously present a fresh surface thereof to the water from which oil is to be removed, and means for removing a portion of the liquid absorbed by said blanket.

JOHN W. BROWN.